April 19, 1932. F. H. ROBINSON 1,855,000
DEMOUNTABLE RIM FOR VEHICLE TIRES
Filed Oct. 11, 1929
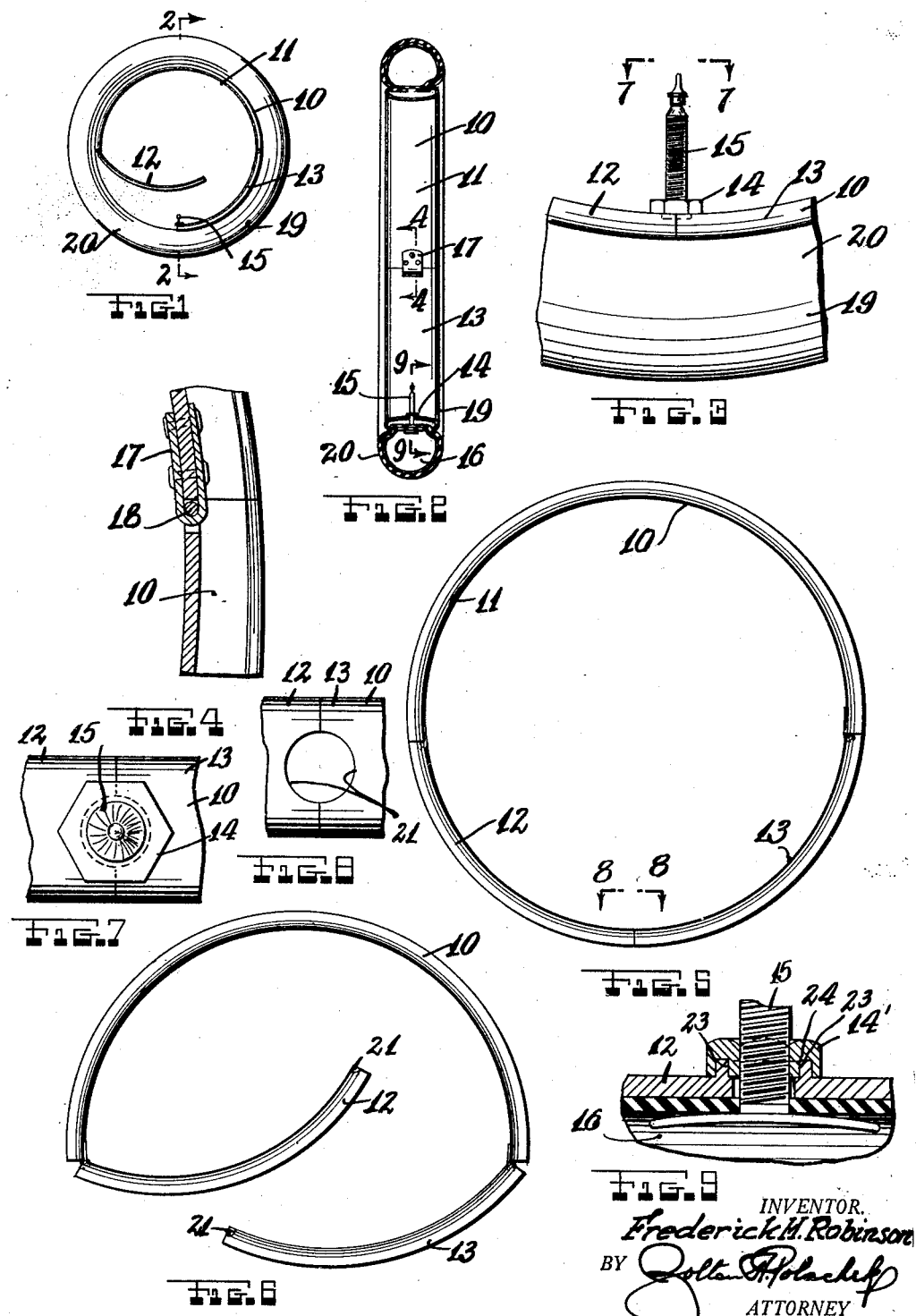

Patented Apr. 19, 1932

1,855,000

UNITED STATES PATENT OFFICE

FREDERICK H. ROBINSON, OF NEW YORK, N. Y., ASSIGNOR OF ONE-HALF TO TERENCE COOKE, OF NEW YORK, N. Y.

DEMOUNTABLE RIM FOR VEHICLE TIRES

Application filed October 11, 1929. Serial No. 398,847.

This invention relates to new and useful improvements in a demountable rim for vehicle tires.

The invention has for an object the provision of a device of the class mentioned which is of simple durable construction, dependable in use and efficient in action, and which can be manufactured and sold at a reasonable cost.

The invention proposes a demountable rim consisting of a circular rim made of several sections hinged together and arranged for maintaining circular form by the clamping action of a member on the air inlet stem of the inner tube of a tire upon which the rim is mounted, and for being collapsed to be conveniently removed from the tire upon removal of said member.

At the present time there are numerous demountable rims on the market but each have defects that prevent commercial success. These defects notably exist in the means for holding the sections in circular form. The present invention eliminates massive construction when compared with previous devices. It may easily be conceived that a massive structure is exposed to dirt which binds it and thus prevents satisfactory operation.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:—

Fig. 1 is an elevational view of a tire provided with the demountable rim constructed according to this invention, one section being shown moved for collapsing the rim.

Fig. 2 is a vertical sectional view taken on the line 2—2 of Fig. 1.

Fig. 3 is an enlarged detailed elevational view of a portion of Fig. 1 showing the rim in operative position.

Fig. 4 is an enlarged detailed fragmentary sectional view taken on the line 4—4 of Fig. 2.

Fig. 5 is a side elevational view of the rim, per se.

Fig. 6 is a view similar to Fig. 5 but showing the rim collapsed.

Fig. 7 is an elevational view looking in the direction of the arrows 7—7 of Fig. 3.

Fig. 8 is a similar view looking in the direction of the arrows 8—8 of Fig. 5.

Fig. 9 is an enlarged detailed fragmentary sectional view as though taken on the line 9—9 of Fig. 2 but illustrating another embodiment of the invention.

The demountable rim consists of a circular rim 10 made of several sections, namely 11, 12 and 13 hinged together and arranged for maintaining circular form by the clamping action of member 14 on the air inlet stem 15 of the inner tube 16 of a tire, and for being collapsed to be conveniently removed from the tire upon removal of said member 14.

The said circular rim is of conventional design for engaging within a tire shoe. Section 11 is substantially one-half of the circumference, and sections 12 and 13 are each one-quarter thereof. The remote ends of the sections 12 and 13 are hinged to the ends of the section 11. The hinge construction is simple and efficient and consists of a bent member 17 attached upon the section 11 and engaged by a pintle 18 supported on the other section.

In Figs. 1 to 3, a tire 19 has been illustrated and consists of a shoe 20 and the said inner tube 16. The inner tube is provided with the customary air inlet stem 15 threaded on its outer side. The member 14 threadedly engages upon the stem 15 and constitutes the conventional nut for this stem. The adjacent ends of the sections 12 and 13 terminate beneath the nut 16 and each end is formed with a recess 21 permitting the passage of the stem.

In operation, the nut 14 is depended upon to hold the demountable rim in circular form. For collapsing the rim, it is necessary to first remove the nut 14, next to deflate the inner tube and then the stem 15 may be slightly bent to one side while one of the sections is pivoted upwards to a position shown in Fig.

1. Next the stem 15 may be bent to the other side and the other section pivoted up. The rim may then be removed.

In Fig. 9, a modified form of the device has been illustrated which is provided with a means for communicating stresses and strains due to the sections of the rim attempting to collapse, to the clamping member. This means comprises a semi-circular ridge 23 projecting from each of the adjacent ends of the sections 12 and 13. The semi-circular ridges together constitute a complete circle. The member 14' is formed with a circular recess 24 arranged for receiving the ridges 23.

According to this arrangement the demountable rim is firmly locked in its circular form. Any stresses and strains due to the attempt to collapse are communicated to the nut 14' which is designed for carrying such loads. It is pointed out that without the use of the ridges and the recess, strains will be communicated to the inner tube 16 which is flexible to some degree even in inflated condition. This arrangement therefore also produces a more rigid rim.

While I have shown and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:—

In a split demountable tire rim having two free ends, said ends having opposed recesses which together form an opening through which the valve-stem of the tire is adapted to pass; means for connecting said ends comprising a semi-circular ridge on each of said ends adjacent said opening for forming a complete circle around the opening when the ends are in engaged position, the outer and inner surfaces of said ridges being substantially parallel to each other and extending substantially at right angles to a plane tangent to the rim at the meeting ends thereof, a threaded valve stem from said tire extending through said opening and a nut threadedly engaged on said valve stem and formed with a complementary circular recess for slidable frictional engagement over said circular ridge, whereby the nut may be screwed along on the valve stem to a position engaging the ridge to prevent separation of said ends.

In testimony whereof I have affixed my signature.

FREDERICK H. ROBINSON.